US012729256B2

(12) United States Patent
Gong et al.

(10) Patent No.: US 12,729,256 B2
(45) **Date of Patent: *Sep. 8, 2026**

(54) COMPOSITION FOR ENCAPSULANT FILM AND ENCAPSULANT FILM COMPRISING THE SAME

(71) Applicant: LG Chem, Ltd., Seoul (KR)

(72) Inventors: Jin Sam Gong, Daejeon (KR); Eun Jung Lee, Daejeon (KR); Young Woo Lee, Daejeon (KR); Jung Ho Jun, Daejeon (KR); Jin Kuk Lee, Daejeon (KR); Sang Hyun Hong, Daejeon (KR); Jong Gil Kim, Daejeon (KR); Hye Ji Lee, Daejeon (KR); Sang Wook Han, Daejeon (KR)

(73) Assignee: LG Chem, Ltd., Seoul (KR)

( * ) Notice: Subject to any disclaimer, the term of this patent is extended or adjusted under 35 U.S.C. 154(b) by 982 days.

This patent is subject to a terminal disclaimer.

(21) Appl. No.: 17/639,480

(22) PCT Filed: Apr. 16, 2021

(86) PCT No.: PCT/KR2021/004831

§ 371 (c)(1),
(2) Date: Mar. 1, 2022

(87) PCT Pub. No.: WO2021/210961

PCT Pub. Date: Oct. 21, 2021

(65) Prior Publication Data

US 2022/0340698 A1 Oct. 27, 2022

(30) Foreign Application Priority Data

Apr. 16, 2020 (KR) ........................ 10-2020-0046025
Aug. 19, 2020 (KR) ........................ 10-2020-0103862

(51) Int. Cl.
*C08F 210/16* (2006.01)
*C08F 4/6592* (2006.01)

(52) U.S. Cl.
CPC .......... *C08F 210/16* (2013.01); *C08F 4/6592* (2013.01); *C08F 2420/02* (2013.01); *C08F 2420/06* (2013.01); *C08F 2500/055* (2021.01); *C08F 2500/08* (2013.01); *C08F 2500/34* (2021.01)

(58) Field of Classification Search
CPC .................. C08F 210/16; C08F 4/6592; C08F 2500/055; C08F 2500/34; C08F 2420/02; C08F 2420/06; C08F 2500/08
USPC .......................................................... 106/285
See application file for complete search history.

(56) References Cited

U.S. PATENT DOCUMENTS 5,874,513 A 2/1999 Watanabe et al.
6,162,871 A 12/2000 Watanabe et al.
6,423,808 B1 7/2002 Watanabe et al.
9,481,747 B2 11/2016 Park et al.
9,550,848 B2 1/2017 Lee et al.
9,587,094 B2 3/2017 Maeyama et al.
9,663,525 B2 5/2017 Afroze et al.
12,037,426 B2 7/2024 Park et al.
12,065,515 B2 8/2024 Park et al.
12,162,967 B2 12/2024 Park et al.
2008/0255311 A1 10/2008 Chang et al.
2009/0270580 A1 10/2009 Satoh et al.
2010/0062927 A1 3/2010 Lee et al.
2011/0118418 A1 5/2011 Chang et al.
2011/0172451 A1 7/2011 Lee et al.
2011/0177935 A1 7/2011 Lee et al.
2013/0167911 A1 7/2013 Ikenaga et al.
2013/0213471 A1 8/2013 Ikenaga et al.
2015/0031812 A1 1/2015 Choi et al.
2015/0158962 A1 6/2015 Choi et al.
2015/0349163 A1 12/2015 Choi et al.
2015/0376479 A1 12/2015 Kim et al.
2016/0046735 A1 2/2016 Lee et al.
2016/0272743 A1 9/2016 Park et al.
2016/0289358 A1 10/2016 Gong et al.
2016/0326281 A1 11/2016 Kim et al.
(Continued)

FOREIGN PATENT DOCUMENTS

CN 112625162 A 4/2021
EP 2637217 A1 9/2013
(Continued)

OTHER PUBLICATIONS

Machine translation of KR 102071594 B1. (Year: 2020).*
Extended European Search Report for Application No. 21788446.9 dated Oct. 18, 2022. 9 pgs.
Extended European Search Report for Application No. 21788120.0 dated Oct. 18, 2022. 10 pgs.
International Search Report for Application No. PCT/KR2021/004828 mailed Jul. 28, 2021, 3 pages.
International Search Report for Application No. PCT/KR2021/004831 mailed Jul. 21, 2021, 2 pages.

*Primary Examiner* — Coris Fung
*Assistant Examiner* — Catriona M Corallo
(74) *Attorney, Agent, or Firm* — Lerner David LLP

(57) ABSTRACT

Provided are a composition for an encapsulant film, and an encapsulant film using the same and having excellent volume resistance and light transmittance, wherein the composition includes an ethylene/alpha-olefin copolymer satisfying the following conditions (a) to (c):

(a) a density is 0.85 to 0.89 g/cc;
(b) a melting temperature (Tm) having a maximum peak in a curve obtained by differential scanning calorimetry (DSC) is 40 to 90° C.; and
(c) the melting temperature (Tm) and an elution temperature (Te) having a maximum peak in a curve obtained by cross-fractionation chromatography (CFC) satisfy Equation 1:

$$35°\ C. < Tm - Te < 65°\ C. \quad \text{[Equation 1]}$$

12 Claims, No Drawings

(56) References Cited

U.S. PATENT DOCUMENTS

| | | | |
|---|---|---|---|
| 2019/0135963 | A1 | 5/2019 | Kim et al. |
| 2019/0233553 | A1 | 8/2019 | Kim et al. |
| 2020/0115517 | A1 | 4/2020 | He et al. |
| 2020/0369807 | A1 | 11/2020 | Park et al. |
| 2020/0385497 | A1 | 12/2020 | Kwon et al. |
| 2022/0049030 | A1 | 2/2022 | Park et al. |
| 2022/0049033 | A1 | 2/2022 | Park et al. |
| 2022/0185920 | A1 | 6/2022 | Park et al. |
| 2022/0340698 | A1 | 10/2022 | Gong et al. |
| 2023/0047706 | A1 | 2/2023 | He et al. |

FOREIGN PATENT DOCUMENTS

| | | | |
|---|---|---|---|
| EP | 3885377 | A1 | 9/2021 |
| EP | 3936566 | A1 | 1/2022 |
| JP | 2006265388 | A | 10/2006 |
| JP | 2008-545015 | A | 12/2008 |
| JP | 2010258439 | A | 11/2010 |
| JP | 2012238857 | A | 12/2012 |
| JP | 2016536396 | A | 11/2016 |
| JP | 2016213401 | A | 12/2016 |
| JP | 2020529481 | A | 10/2020 |
| JP | 2022510678 | A | 1/2022 |
| KR | 20080070637 | A | 7/2008 |
| KR | 100976131 | B1 | 8/2010 |
| KR | 20110024036 | A | 3/2011 |
| KR | 20140082578 | A | 7/2014 |
| KR | 101493183 | B1 | 2/2015 |
| KR | 20150034653 | A | 4/2015 |
| KR | 20150050485 | A | 5/2015 |
| KR | 20160054849 | A | 5/2016 |
| KR | 20160061107 | A | 5/2016 |
| KR | 101642592 | B1 | 7/2016 |
| KR | 20160115700 | A | 10/2016 |
| KR | 20180033008 | A | 4/2018 |
| KR | 20180054059 | A | 5/2018 |
| KR | 20180055221 | A | 5/2018 |
| KR | 20180063669 | A | 6/2018 |
| KR | 20180071592 | A | 6/2018 |
| KR | 20190078531 | A | 7/2019 |
| KR | 20190079381 | A | 7/2019 |
| KR | 20190096290 | A | 8/2019 |
| KR | 102071594 | B1 | 2/2020 |
| KR | 102083001 | B1 | 2/2020 |
| WO | 2006101930 | A2 | 9/2006 |
| WO | 2007-034920 | A1 | 3/2007 |
| WO | 2016186295 | A1 | 11/2016 |
| WO | 2019084773 | A1 | 5/2019 |
| WO | 2020171631 | A1 | 8/2020 |
| WO | 2021071154 | A1 | 4/2021 |

* cited by examiner

COMPOSITION FOR ENCAPSULANT FILM AND ENCAPSULANT FILM COMPRISING THE SAME

CROSS-REFERENCE TO RELATED APPLICATIONS

The present application is a national stage entry under 35 U.S.C. § 371 of International Application No. PCT/KR2021/004831 filed on Apr. 16, 2021, which claims priority from Korean Patent Application Nos. 10-2020-0046025, filed on Apr. 16, 2020, and 10-2020-0103862, filed on Aug. 19, 2020, all of which are incorporated herein by reference.

TECHNICAL FIELD

The present invention relates to a composition for an encapsulant film including an ethylene/alpha-olefin copolymer having excellent volume resistance and light transmittance, and an encapsulant film using the same.

BACKGROUND ART

As global environmental problems, energy problems, etc. get worse and worse, solar cells receive attention as a clean energy generating means without fear of exhaustion. If solar cells are used outside such as the roof of a building, generally, a module type is used. In order to obtain a crystalline solar cell module when manufacturing a solar cell module, protection sheet for solar cell module (surface side transparent protection member)/solar cell encapsulant/crystalline solar cell device/solar cell encapsulant/protection sheet for solar cell module (back side protection member) are stacked in order.

As the solar cell encapsulant, generally, an ethylene/vinyl acetate copolymer or ethylene/alpha-olefin copolymer, etc. is used. In addition, in the solar cell encapsulant, a light stabilizer is generally included as an additive considering the requirement on climate-resistance for a long time, and in addition, considering the adhesiveness of a transparent surface side protection member or a back side protection member represented by glass, a silane coupling agent is commonly included in the solar cell sealant. However, if an ethylene/vinyl acetate copolymer is used as the constituent material of a solar cell encapsulant, it has been apprehended that components such as an acetic acid gas generated by the decomposition of the ethylene/vinyl acetate copolymer might influence a solar cell device.

In addition, the increase of the scale of a power generation system such as a mega solar is conducted along with the recent dissemination of the power generation of the sunlight, and for the purpose of reducing transmission loss, there are moves to increase a voltage of a system voltage. As the system voltage increases, a potential difference between a frame and cells increases in a solar cell module. That is, the frame of a solar cell module is generally grounded, and if the system voltage of a solar cell array is from 600 V to 1000 V, the potential difference between the frame and the cells becomes from 600 V to 1000 V just the same in a module with the highest voltage, and the power generation is maintained during the day in a high-voltage applied state. In addition, glass has lower electric resistance when compared with an encapsulant, and due to the interposition of the frame, a high voltage is generated between the glass and the cells. That is, under the circumstance of generating power during the day, in a module with series connection, a potential difference between the cells and the module, and the cells and glass side increases in succession from a grounded side, and at the greatest point, almost the same potential difference of the system voltage is maintained. In a solar cell module used in such a state, output is largely reduced, and an example of a module using a crystalline power generation device in which potential induced degradation (PID) phenomenon arising degradation is generated, has been reported. Accordingly, in order to solve the problems, a solar cell encapsulant which comes into direct contact with the solar cell device, having even higher volume intrinsic resistance is required.

Volume resistance or specific resistance (p) known as electric resistance is defined as electric resistance between facing surfaces of 1 $m^3$ of a material, and it is important to obtain a molded article in which this volume resistance may be reproduced in a predetermined range in all application divisions and permanent. In an electric insulation material field for a high-voltage power cable, low-density polyethylene processed at a high pressure, crosslinked polyethylene, etc. are widely used due to excellent electric properties. One of the difficulties of the high-voltage power cable is the power loss shown during power transmission, and the reduction of the power loss could be attained by increasing the high-voltage properties, particularly, volume resistance of an insulating material. However, in the insulating material for a power cable, the inner part of a conductor is heated to a high temperature (about 90° C.) by heat generated by the passing of current, but the outer part of the conductor maintains room temperature. The conventional polyethylene shows marked drop of volume resistance near the inner conductor through the passing of current.

As described above, the development of an ethylene/alpha-olefin copolymer widely utilized as a material having excellent volume resistance and requiring high insulation such as a solar cell encapsulant is still required.

PRIOR ART DOCUMENT

Patent Document (Patent Document 1) Korean Laid-open Patent No. 2018-0063669

DISCLOSURE OF THE INVENTION

Technical Problem

An object of the present invention is to provide a composition for an encapsulant film accomplishing excellent volume resistance and light transmittance at once, and may be usefully utilized as an insulating material.

Another object of the present invention is to provide a method for preparing the composition for an encapsulant film, and an encapsulant film manufactured using the composition for an encapsulant film.

Technical Solution

To solve the above tasks, the present invention provides a composition for an encapsulant film including an ethylene/alpha-olefin copolymer satisfying the following conditions (a) to (c):

(a) a density is 0.85 to 0.89 g/cc;

(b) a melting temperature (Tm) having a maximum peak in a curve obtained by differential scanning calorimetry (DSC) is 40 to 90° C.; and (c) the melting temperature (Tm) and an elution temperature (Te) having a maximum peak in a curve obtained by cross-fractionation chromatography (CFC) satisfy the following Equation 1:

$$35° C.<Tm-Te<65° C. \quad \text{[Equation 1]}$$

In addition, the present invention provides an encapsulant film including the composition for an encapsulant film.

Advantageous Effects

The composition for an encapsulant film, including an ethylene/alpha-olefin copolymer satisfying all the conditions defined in the present invention, has high volume resistance and excellent insulating properties, and accordingly, may be widely used for various uses in electric and electronic industrial fields, and particularly, if used in a solar cell module, PID phenomenon may be delayed as much as possible, high light transmittance may be shown, and excellent module efficiency may be accomplished.

BEST MODE FOR CARRYING OUT THE INVENTION

Hereinafter, the present invention will be described in more detail to assist the understanding of the present invention.

It will be understood that words or terms used in the present disclosure and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Composition for Encapsulant Film

The composition for an encapsulant film of the present invention is characterized in including an ethylene/alpha-olefin copolymer satisfying the following conditions (a) to (c):

(a) a density is 0.85 to 0.89 g/cc;

(b) a melting temperature (Tm) having a maximum peak in a curve obtained by differential scanning calorimetry (DSC) is 40 to 90° C.; and (c) the melting temperature (Tm) and an elution temperature (Te) having a maximum peak in a curve obtained by cross-fractionation chromatography (CFC) satisfy the following Equation 1:

$$35° C.<Tm-Te<65° C. \quad \text{[Equation 1]}$$

The present invention relates to a composition for an encapsulant film showing high volume resistance and showing excellent electrical insulation, and since an ethylene/alpha-olefin copolymer included in the composition for an encapsulant film of the present invention satisfies a specific range of a difference between a melting temperature measured by DSC and an elution temperature measured by CFC, high volume resistance and excellent light transmittance may be shown.

Particularly, the ethylene/alpha-olefin copolymer is prepared by mixing and using transition metal compounds represented by Formula 1 and Formula 2 as a catalyst, as described later. The introduction of an alpha-olefin-based monomer into the transition metal compound represented by Formula 1 is difficult due to the structural characteristics of a catalyst, and a copolymer of a high-density region tends to be prepared, and since a large amount of alpha-olefin may be introduced into the transition metal compound represented by Formula 2, a polymer in a very low-density region (elastomer) may also be prepared. Accordingly, if each of the two transition metal compounds is used solely, copolymerization properties of mixing and introducing an alpha-olefin-based monomer are different.

The ethylene/alpha-olefin copolymer prepared by using the mixture composition as a catalyst, is a copolymer in which both a low-density region in which a large amount of an alpha-olefin-based monomer is mixed and introduced and a high-density region in which a small amount of an alpha-olefin-based monomer is mixed and introduced are present, and which shows a Tm−Te value of a constant value or more. This means that both a high-crystalline region and a low-crystalline region are included, and accordingly, crystallinity distribution is wide and a free volume is small. Accordingly, the charge mobility of a polymer is low, and volume resistance is high. In addition, if the Tm−Te value is too high, the volume resistance may be rather degraded due to the low-crystalline region, and the light transmittance may also be degraded due to the high-crystalline region, and in the present invention, a suitable range of the Tm−Te value, capable of accomplishing both the volume resistance and light transmittance excellently, is derived, and a composition for an encapsulant film using an ethylene/alpha-olefin copolymer satisfying the value has been developed.

The ethylene/alpha-olefin copolymer included in the composition for an encapsulant film of the present invention is a polymer having a low density in a range of 0.85 to 0.89 g/cc, and particularly, the density may be 0.850 g/cc or more, 0.860 g/cc or more, or 0.870 g/cc or more, and 0.890 g/cc or less, or 0.880 g/cc or less. In this case, the density may mean a density measured according to ASTM D-792.

Generally, the density of the ethylene/alpha-olefin copolymer is influenced by the type and amount of a monomer used for polymerization, a polymerization degree, etc., and is largely influenced by the amount of a comonomer in case of a copolymer. In this case, if the amount of the comonomer increases, an ethylene/alpha-olefin copolymer of a low density may be prepared, and the amount of the comonomer introduced into the copolymer may be dependent on the intrinsic copolymerization properties of a catalyst.

The ethylene/alpha-olefin copolymer included in the composition for an encapsulant film of the present invention is a copolymer prepared using the compounds represented by Formula 1 and Formula 2 as catalysts, and shows a low density as described above, and as a result, excellent processability may be shown.

In the ethylene/alpha-olefin copolymer included in the composition for an encapsulant film of the present invention, the melting temperature (Tm) having a maximum peak in a curve obtained by differential scanning calorimetry (DSC) and an elution temperature (Te) having a maximum peak in a curve obtained by cross-fractionation chromatography (CFC) satisfy Equation 1 below.

$$35° C.<Tm-Te<65° C. \quad \text{[Equation 1]}$$

Here, the melting temperature means the maximum temperature of the highest peak in the DSC curve which is represented by heat flow with respect to temperature, and the elution temperature means the maximum temperature of the highest peak in the CFC elution curve which is represented by elution amount with respect to temperature (dC/dT).

The cross-fractionation chromatography (CFC) is a method of combining temperature rising elution fractionation (TREF) and gel filtration chromatography (GPC), and through this, the crystallinity distribution of an ethylene/alpha-olefin copolymer may be measured. Particularly, a specimen solution of a high temperature, in which an ethylene/alpha-olefin copolymer is completely dissolved in a solvent is injected into a column filled with an inert carrier, the temperature of the column is lowered to attach the specimen on the surface of the filler, and the temperature of the column is gradually elevated while flowing o-dichlorobenzene in the column. The concentration of an olefin-based copolymer eluted at each temperature is detected, and at the same time, the component eluted at each temperature is sent to GPC via online for each fraction to obtain a chromatogram, and after that, since the elution temperature is elevated according to the increase of the crystallinity of the eluted component, the crystallinity distribution of the ethylene/alpha-olefin copolymer may be found by obtaining the relation of the elution temperature and the elution amount (wt %) of the ethylene/alpha-olefin copolymer.

If the Tm−Te value is 35° C. or less, the content of the high-crystalline region in the copolymer is low, and problems of degrading the volume resistance may arise, and if the Tm Te value is 65° C. or more, the crystalline distribution of the copolymer may be excessively broadened, and problems of deteriorating light transmittance due to the high-crystalline region and deteriorating volume resistance due to the low-crystalline region may arise.

The ethylene/alpha-olefin copolymer included in the composition for an encapsulant film of the present invention may have a melting temperature (Tm) having the maximum peak in a curve obtained by differential scanning calorimetry (DSC) of 40 to 90° C. Particularly, the melting temperature may be 40° C. or more, 50° C. or more, 55° C. or more, 60° C. or more, 61° C. or more, and 90° C. or less, 80° C. or less, 75° C. or less, 70° C. or less, 68° C. or less.

As described above, the ethylene/alpha-olefin copolymer included in the composition for an encapsulant film of the present invention is characterized in satisfying the Tm−Te value represented by Equation 1, and at the same time having a density of 0.85 to 0.89 g/cc and a melting temperature (Tm) of 40 to 90° C. Though satisfying Equation 1, if the density or melting temperature (Tm) value deviate from the above-described ranges and are too high, problems of deteriorating light transmittance may arise, and if all conditions (a) to (c) defined in the present invention are satisfied, excellent volume resistance and light transmittance may be achieved at the same time, for example, may show physical properties suitable for the use in an encapsulant film of a solar cell.

In addition, the elution temperature (Te) may be 10 to 50° C., particularly, 10° C. or more, 15° C. or more, 20° C. or more, 25° C. or more, and 50° C. or less, 40° C. or less, 35° C. or less, 30° C. or less.

The ethylene/alpha-olefin copolymer included in the composition for an encapsulant film of the present invention has narrow molecular weight distribution (MWD) of 1.5 to 2.5. More particularly, the molecular weight distribution may be 1.5 or more, 1.7 or more, 1.8 or more, 2.0 or more, and 2.5 or less, 2.4 or less, 2.3 or less, 2.2 or less.

Generally, if two or more types of monomers are polymerized, molecular weight distribution increases, and as a result, impact strength and mechanical properties are reduced, and there is possibility of generating blocking phenomenon, etc. Particularly, since the polymerization properties of a monomer are different according to the catalyst, the molecular weight of a polymer finally prepared may be influenced by the type of the catalyst. If two or more types of catalysts are mixed and used in polymerization reaction, and if the difference of the polymerization properties of the catalysts is large, there are problems of increasing the molecular weight distribution of a polymer.

In order to reduce the molecular weight distribution to prevent the degradation of the crosslinking properties, impact strength, mechanical properties, etc. of a copolymer, a suitable amount of hydrogen may be injected during polymerization reaction to prevent the generation of arbitrary β-hydride elimination reaction in a polymer chain and induce uniform termination reaction, and in this case, the weight average molecular weight and melt index of the copolymer tend to decrease according to the injection of hydrogen. Accordingly, appropriate catalyst type and hydrogen injection amount are determined in ranges for achieving both the intrinsic properties of a catalyst structure influencing the weight average molecular weight and the melt index and the reducing effects of molecular weight distribution according to the injection of hydrogen.

Considering the above-described points, in the present invention, since an optimized amount of hydrogen is injected while mixing a transition metal compound represented by Formula 1 and a transition metal compound represented by Formula 2 and using thereof as a catalyst, the above-described range of narrow molecular weight distribution may be shown, and high volume resistance and light transmittance may be shown while preventing the degradation of the crosslinking properties, impact strength, mechanical properties, etc.

The weight average molecular weight (Mw) and the number average molecular weight (Mn) are polystyrene converted molecular weights analyzed by gel permeation chromatography (GPC), and the molecular weight distribution may be calculated from a ratio of Mw/Mn.

The ethylene/alpha-olefin copolymer included in the composition for an encapsulant film of the present invention may have a weight average molecular weight (Mw) of 40,000 to 150,000 g/mol. Particularly, the weight average molecular weight may be 40,000 g/mol or more, 45,000 g/mol or more, 50,000 g/mol or more, and 150,000 g/mol or less, 130,000 g/mol or less, 100,000 g/mol or less, 90,000 g/mol or less, or 80,000 g/mol or less.

The ethylene/alpha-olefin copolymer included in the composition for an encapsulant film of the present invention has a melt index (MI, 190° C., 2.16 kg load conditions) of 1 to 100 dg/min. Particularly, the melt index may be 1 dg/min or more, 2 dg/min or more, 3 dg/min or more, or 4 dg/min or more, and 100 dg/min or less, 50 dg/min or less, 20 dg/min or less, or 15 dg/min or less.

If the melt index is less than 1 dg/min, a production rate may be reduced due to high load, and if the melt index is greater than 100 dg/min, film molding is difficult, and defects of unsuitable for the use as an encapsulant film may arise.

The ethylene/alpha-olefin copolymer included in the composition for an encapsulant film of the present invention is prepared by copolymerizing ethylene and an alpha-olefin-based monomer, and in this case, the alpha-olefin which means a moiety derived from an alpha-olefin-based monomer in the copolymer may be C4 to C20 alpha-olefin, particularly, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, etc., and any one among them or mixtures of two or more thereof may be used.

Among them, the alpha-olefin may be 1-butene, 1-hexene or 1-octene, preferably, 1-butene, 1-hexene, or a combination thereof.

In addition, in the ethylene/alpha-olefin copolymer, the alpha-olefin content may be suitably selected in the range satisfying the physical conditions, particularly, greater than 0 mol % and 99 mol % or less, or 10 to 50 mol %, without limitation.

The aforementioned ethylene/alpha-olefin copolymer may be prepared by a preparation method including: a step of polymerizing ethylene and an alpha-olefin-based monomer in the presence of a catalyst composition including transition metal compounds represented by Formula 1 and Formula 2 below.

[Formula 1]

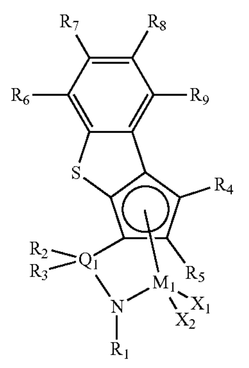

In Formula 1, $R_1$ is hydrogen; alkyl of 1 to 20 carbon atoms; cycloalkyl of 3 to 20 carbon atoms; alkenyl of 2 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, $R_2$ and $R_3$ are each independently hydrogen; halogen; alkyl of 1 to 20 carbon atoms; cycloalkyl of 3 to 20 carbon atoms; alkenyl of 2 to 20 carbon atoms; arylalkyl of 7 to 20 carbon atoms; alkylamido of 1 to 20 carbon atoms; or arylamido of 6 to 20 carbon atoms, $R_4$ and $R_5$ are each independently hydrogen; alkyl of 1 to 20 carbon atoms; cycloalkyl of 3 to 20 carbon atoms; aryl of 6 to 20 carbon atoms; or alkenyl of 2 to 20 carbon atoms, $R_6$ to $R_9$ are each independently hydrogen; alkyl of 1 to 20 carbon atoms; cycloalkyl of 3 to 20 carbon atoms; aryl of 6 to 20 carbon atoms; or alkenyl of 2 to 20 carbon atoms, two or more adjacent groups among $R_6$ to $R_9$ may be connected with each other to form a ring, $Q_1$ is Si, C, N, P or S, $M_1$ is Ti, Hf or Zr, and $X_1$ and $X_2$ are each independently hydrogen; halogen; alkyl of 1 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; alkylamino of 1 to 20 carbon atoms; or arylamino of 6 to 20 carbon atoms.

[Formula 2]

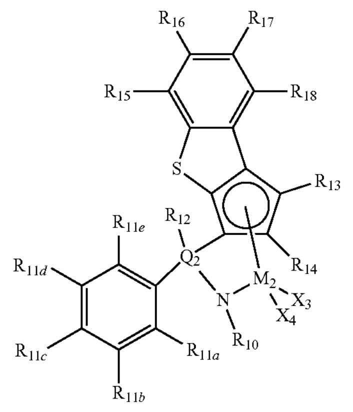

In Formula 2, $R_{10}$ is hydrogen; alkyl of 1 to 20 carbon atoms; cycloalkyl of 3 to 20 carbon atoms; alkenyl of 2 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, $R_{11a}$ to $R_{11e}$ are each independently hydrogen; halogen; alkyl of 1 to 20 carbon atoms; cycloalkyl of 3 to 20 carbon atoms; alkenyl of 2 to 20 carbon atoms; alkoxy of 1 to 20 carbon atoms; or aryl of 6 to 20 carbon atoms, $R_{12}$ is hydrogen; halogen; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to carbon atoms; arylalkyl of 7 to 20 carbon atoms; alkylamido of 1 to 20 carbon atoms; or arylamido of 6 to 20 carbon atoms, $R_{13}$ and $R_{14}$ are each independently hydrogen; alkyl of 1 to 20 carbon atoms; cycloalkyl of 3 to 20 carbon atoms; aryl of 6 to 20 carbon atoms; or alkenyl of 2 to 20 carbon atoms, $R_{15}$ to $R_{18}$ are each independently hydrogen; alkyl of 1 to 20 carbon atoms; cycloalkyl of 3 to 20 carbon atoms; aryl of 6 to 20 carbon atoms; or alkenyl of 2 to 20 carbon atoms, two or more adjacent groups among $R_{15}$ to $R_{18}$ may be connected with each other to form a ring, $Q_2$ is Si, C, N, P or S, $M_2$ is Ti, Hf or Zr, and $X_3$ and $X_4$ are each independently hydrogen; halogen; alkyl of 1 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; alkylamino of 1 to 20 carbon atoms; or arylamino of 6 to 20 carbon atoms.

Particularly, in Formula 1, $R_1$ is hydrogen; alkyl of 1 to 20 carbon atoms; cycloalkyl of 3 to 20 carbon atoms; alkenyl of 2 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, and more particularly, $R_1$ may be methyl, ethyl, propyl, butyl, isobutyl, t-butyl, isopropyl, cyclohexyl, benzyl, phenyl, methoxyphenyl, ethoxyphenyl, fluorophenyl, bromophenyl, chlorophenyl, dimethylphenyl or diethylphenyl.

Particularly, in Formula 1, $R_2$ and $R_3$ are each independently hydrogen; halogen; alkyl of 1 to 20 carbon atoms; cycloalkyl of 3 to 20 carbon atoms; alkenyl of 2 to 20 carbon atoms; arylalkyl of 7 to 20 carbon atoms; alkylamido of 1 to 20 carbon atoms; or arylamido of 6 to 20 carbon atoms, and more particularly, $R_2$ and $R_3$ may be each independently hydrogen; alkyl of 1 to 20 carbon atoms; or arylalkyl of 7 to 20 carbon atoms.

Particularly, in Formula 1, $R_4$ and $R_5$ may be the same or different, and may be each independently hydrogen; alkyl of 1 to 20 carbon atoms; cycloalkyl of 3 to 20 carbon atoms; aryl of 6 to 20 carbon atoms; or alkenyl of 2 to 20 carbon atoms, more particularly, alkyl of 1 to 6 carbon atoms. More particularly, $R_4$ and $R_5$ may be methyl, ethyl or propyl.

Particularly, in Formula 1, $R_6$ to $R_9$ may be the same or different and may be each independently hydrogen; alkyl of 1 to 20 carbon atoms; cycloalkyl of 3 to 20 carbon atoms; aryl of 6 to 20 carbon atoms; or alkenyl of 2 to 20 carbon atoms. More particularly, $R_6$ to $R_9$ may be the same or different and may be each independently hydrogen or methyl.

Two or more adjacent groups among $R_6$ to $R_9$ may be connected with each other to form an aliphatic ring of 5 to 20 carbon atoms or an aromatic ring of 6 to 20 carbon atoms, and the aliphatic ring or aromatic ring may be substituted with halogen, alkyl of 1 to 20 carbon atoms, alkenyl of 2 to 20 carbon atoms or aryl of 6 to 20 carbon atoms.

Particularly, in Formula 1, $Q_1$ is Si, C, N, P or S, and more particularly, $Q_1$ may be Si.

Particularly, in Formula 1, $M_1$ may be Ti, Hf or Zr.

Particularly, in Formula 1, $X_1$ and $X_2$ may be the same or different and may be each independently hydrogen; halogen; alkyl of 1 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; alkylamino of 1 to 20 carbon atoms; or arylamino of 6 to 20 carbon atoms.

In addition, the compound represented by Formula 1 may be a compound represented by any one among the formula below.

[Formula 1-1]

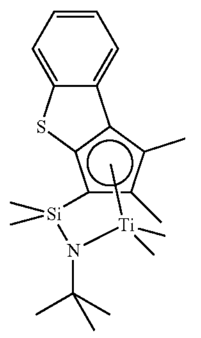

[Formula 1-2]

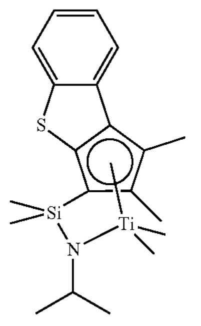

-continued

[Formula 1-3]

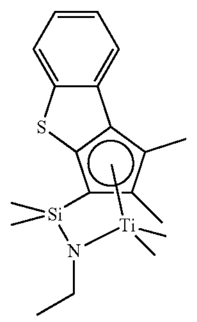

[Formula 1-4]

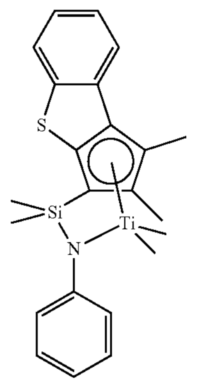

[Formula 1-5]

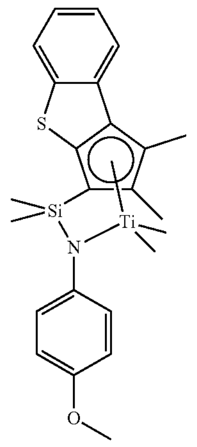

[Formula 1-6]

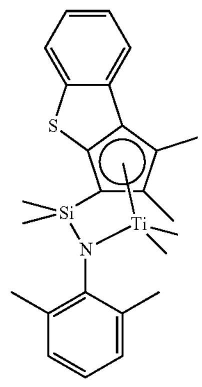

Besides, the compounds may have various structures within the range defined in Formula 1.

In addition, in Formula 2, $R_{10}$ is hydrogen; alkyl of 1 to 20 carbon atoms; cycloalkyl of 3 to 20 carbon atoms; alkenyl of 2 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, and more particularly, $R_{10}$ may be hydrogen; alkyl of 1 to 20 carbon atoms or 1 to 12 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms.

Particularly, in Formula 2, $R_{11a}$ to $R_{11e}$ are each independently hydrogen; halogen; alkyl of 1 to 20 carbon atoms; cycloalkyl of 3 to 20 carbon atoms; alkenyl of 2 to 20 carbon atoms; alkoxy of 1 to 20 carbon atoms; or aryl of 6 to 20 carbon atoms, more particularly, hydrogen; halogen; alkyl of 1 to 12 carbon atoms; cycloalkyl of 3 to 12 carbon atoms; alkenyl of 2 to 12 carbon atoms; alkoxy of 1 to 12 carbon atoms; or phenyl.

Particularly, in Formula 2, $R_{12}$ is hydrogen; halogen; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; alkylamido of 1 to 20 carbon atoms; or arylamido of 6 to 20 carbon atoms, more particularly, hydrogen; halogen; alkyl of 1 to 12 carbon atoms; cycloalkyl of 3 to 12 carbon atoms; alkenyl of 2 to 12 carbon atoms; or phenyl.

Particularly, in Formula 2, $R_{13}$ and $R_{14}$ are each independently hydrogen; alkyl of 1 to 20 carbon atoms; cycloalkyl of 3 to 20 carbon atoms; aryl of 6 to 20 carbon atoms; or alkenyl of 2 to 20 carbon atoms, more particularly, hydrogen; or alkyl of 1 to 12 carbon atoms.

Particularly, in Formula 2, $R_{15}$ to $R_{18}$ are each independently hydrogen; alkyl of 1 to 20 carbon atoms; cycloalkyl of 3 to 20 carbon atoms; aryl of 6 to 20 carbon atoms; or alkenyl of 2 to 20 carbon atoms, more particularly, hydrogen; alkyl of 1 to 12 carbon atoms; or cycloalkyl of 3 to 12 carbon atoms, or hydrogen; or methyl.

Particularly, in Formula 2, two or more adjacent groups among $R_{15}$ to $R_{18}$ may be connected with each other to form a ring.

Particularly, in Formula 2, $Q_2$ is Si, C, N, P or S, and more particularly, Q may be Si.

Particularly, in Formula 2, $X_3$ and $X_4$ are each independently hydrogen; halogen; alkyl of 1 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; alkylamino of 1 to 20 carbon atoms; or arylamino of 6 to 20 carbon atoms, particularly, hydrogen; halogen; alkyl of 1 to 12 carbon atoms; cycloalkyl of 3 to 12 carbon atoms; or alkenyl of 2 to 12 carbon atoms, more particularly, hydrogen; or alkyl of 1 to 12 carbon atoms.

In addition, the compound represented by Formula 2 may be any one among the compounds represented by the formulae below.

[Formula 2-1]

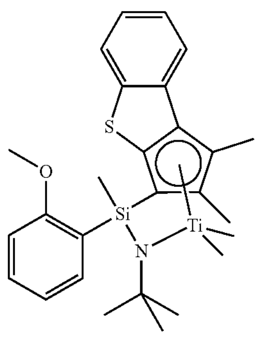

-continued

[Formula 2-2]

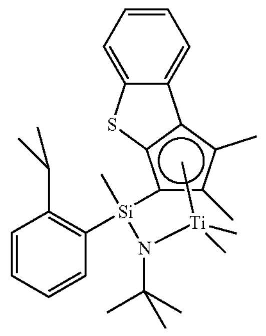

[Formula 2-3]

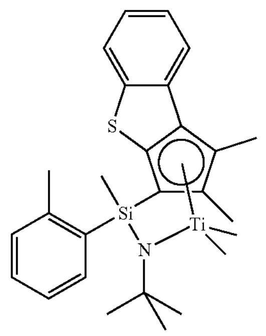

[Formula 2-4]

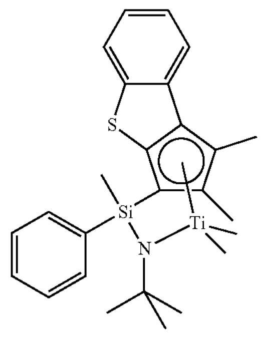

[Formula 2-5]

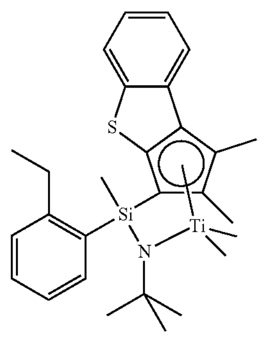

-continued

[Formula 2-6]

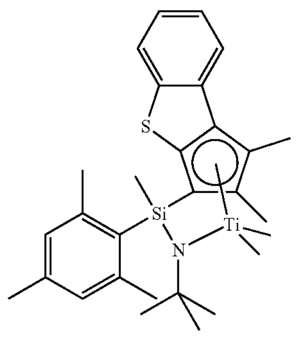

[Formula 2-7]

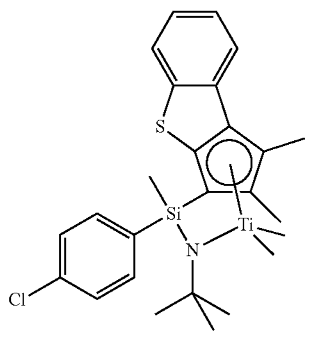

[Formula 2-8]

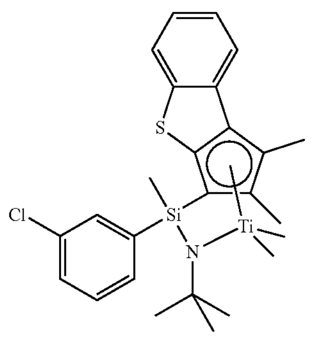

[Formula 2-9]

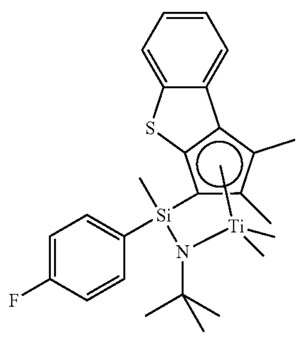

-continued

[Formula 2-10]

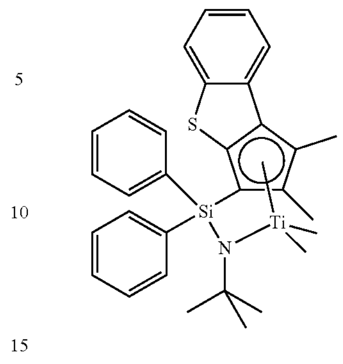

The molar ratio of the transition metal compounds represented by Formula 1 and Formula 2 may be 1:0.5 to 1:8, 1:1 to 1:7, 1:1 to 1:5, 1:1 to 1:4, without limitation.

As described above, the transition metal compounds represented by Formula 1 and Formula 2 used in the present invention have different mixing and introducing capacity of a comonomer, and through this, all conditions defined in the present invention are satisfied, and excellent volume resistance and light transmittance are shown.

The polymerization reaction may be performed by continuously polymerizing ethylene and an alpha-olefin-based monomer by continuously injecting hydrogen in the presence of the catalyst composition, particularly, may be performed by injecting hydrogen in 5 to 100 cc/min.

The hydrogen gas plays the role of restraining vigorous reaction of the transition metal compounds at the initiation point of polymerization and terminating polymerization reaction. Accordingly, by the use of the hydrogen gas and the control of the amount used, an ethylene/alpha-olefin copolymer having narrow molecular weight distribution may be effectively prepared.

For example, the hydrogen may be injected in 5 cc/min or more, 7 cc/min or more, or 10 cc/min or more, or 15 cc/min or more, or 19 cc/min or more, and 100 cc/min or less, or 50 cc/min or less, or 45 cc/min or less, or 35 cc/min or less, or 29 cc/min or less. If injected in the above-described conditions, the ethylene/alpha-olefin copolymer thus prepared may achieve the physical properties of the present invention.

If the hydrogen gas is injected in less than 5 cc/min, the termination of polymerization reaction is not uniformly carried out, and the preparation of an ethylene/alpha-olefin copolymer having desired physical properties may become difficult, and if injected in greater than 100 cc/min, termination reaction may occur too fast, and it is apprehended that an ethylene/alpha-olefin copolymer having a very low molecular weight may be prepared.

In addition, the polymerization reaction may be performed at 100 to 200° C., and by controlling the polymerization temperature together with the injection amount of hydrogen, the crystallinity distribution and the molecular weight distribution in the ethylene/alpha-olefin copolymer may be controlled more advantageously. Particularly, the polymerization reaction may be performed at 100 to 200° C., 120 to 180° C., 130 to 170° C., or 130 to 150° C., without limitation.

In the present invention, a co-catalyst may be additionally used in the catalyst composition for activating the transition metal compounds represented by Formula 1 and/or Formula 2. The co-catalyst is an organometallic compound including a metal in group 13, and may particularly include one or more selected from Formula 3 to Formula 5 below.

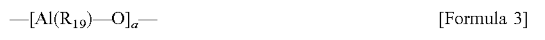
[Formula 3]

In Formula 3, each $R_{19}$ is independently halogen radical; hydrocarbyl radical of 1 to 20 carbon atoms; or halogen-substituted hydrocarbyl radical of 1 to 20 carbon atoms, and a is an integer of 2 or more.

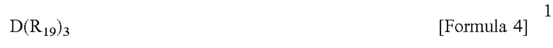
[Formula 4]

In Formula 4,

D is aluminum or boron, and each $R_{19}$ is independently halogen radical; hydrocarbyl radical of 1 to 20 carbon atoms; or halogen-substituted hydrocarbyl radical of 1 to 20 carbon atoms.

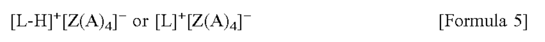
[Formula 5]

In Formula 5,

H is a hydrogen atom,

Z is an element in group 13, each A is independently aryl of 6 to 20 carbon atoms, in which one or more hydrogen atoms may be substituted with substituents; or alkyl of 1 to 20 carbon atoms, the substituent is halogen; hydrocarbyl of 1 to 20 carbon atoms; alkoxy of 1 to 20 carbon atoms; or aryloxy of 6 to 20 carbon atoms, $[L-H]^+$ is trimethylammonium; triethylammonium; tripropylammonium; tributylammonium; diethylammonium; trimethylphosphonium; or triphenylphosphonium, and $[L]^+$ is N,N-diethylanilinium; or triphenylcarbonium.

More particularly, the compound of Formula 3 may be an alkylaluminoxane-based compound in which repeating units are combined in a linear, circular or network shape, and particular example may include methylaluminoxane (MAO), ethylaluminoxane, isobutylaluminoxane or tert-butylaluminoxane.

In addition, the compound of Formula 4 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, etc., particularly, trimethylaluminum, triethylaluminum or triisobutylaluminum, without limitation.

In addition, the compound of Formula 5 may include a borate-based compound of a trisubstituted ammonium salt, a dialkyl ammonium salt or a trisubstituted phosphonium salt type. More particular examples include a borate-based compound of a trisubstituted ammonium salt type such as trimethylammonium tetraphenylborate, methyldioctadecylammonium tetraphenylborate, triethylammonium tetraphenylborate, tripropylammonium tetraphenylborate, tri(n-butyl)ammonium tetraphenylborate, methyltetradecylcyclooctadecylammonium tetraphenylborate, N,N-dimethylanilinium tetraphenylborate, N,N-diethylanilinium tetraphenylborate, N,N-dimethyl(2,4,6-trimethylanilinium)tetraphenylborate, trimethylammonium tetrakis(pentafluorophenyl)borate, methylditetradecylammonium tetrakis(pentaphenyl)borate, methyldioctadecylammonium tetrakis(pentafluorophenyl)borate, triethylammonium, tetrakis(pentafluorophenyl)borate, tripropylammoniumtetrakis(pentafluorophenyl)borate, tri(n-butyl)ammonium tetrakis(pentafluorophenyl)borate, tri(sec-butyl)ammoniumtetrakis(pentafluorophenyl)borate, N,N-dimethylanilinium tetrakis(pentafluorophenyl)borate, N,N-diethylaniliniumtetrakis(pentafluorophenyl)borate, N,N-dimethyl (2,4,6-trimethylanilinium)tetrakis(pentafluorophenyl)borate, trimethylammoniumtetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate and N,N-dimethyl-(2,4,6-trimethylanilinium)tetrakis-(2,3,4,6-tetrafluorophenyl)borate; a borate-based compound of a dialkyl ammonium salt type such as dioctadecylammonium tetrakis(pentafluorophenyl)borate, ditetradecylammonium tetrakis(pentafluorophenyl)borate and dicyclohexylammonium tetrakis(pentafluorophenyl)borate; or a borate-based compound of a trisubstituted phosphonium salt type such as triphenylphosphonium tetrakis(pentafluorophenyl)borate, methyldioctadecylphosphonium tetrakis(pentafluorophenyl)borate and tri(2,6-, dimethylphenyl)phosphoniumtetrakis(pentafluorophenyl)borate, without limitation.

By using such a co-catalyst, the molecular weight distribution of the ethylene/alpha-olefin copolymer finally prepared may become more uniform, and polymerization activity may be improved.

The co-catalyst may be used in a suitable amount so that the activation of the transition metal compounds of Formula 1 and/or Formula 2 may be sufficiently achieved.

In the present invention, the transition metal compounds of Formula 1 and/or Formula 2 may be used in a supported type on a support.

In case where the transition metal compounds of Formula 1 and/or Formula 2 are supported by the support, the weight ratio of the transition metal compounds and the support may be 1:10 to 1:1,000, more particularly, 1:10 to 1:500. If the support and the transition metal compounds are included in a weight ratio in the above range, optimized type may be shown. In addition, if the co-catalyst is supported together by the support, the weight ratio of the co-catalyst and the support may be 1:1 to 1:100, more particularly, 1:1 to 1:50. If the co-catalyst and the support are included in the weight ratio, catalyst activity may be improved, and the microstructure of a polymer prepared may be optimized.

Meanwhile, silica, alumina, magnesia or mixtures thereof may be used as the support, or these materials may be used after drying at a high temperature to remove moisture at the surface and in a state including a hydroxyl group or siloxane group which has high reactivity at the surface. Also, the dried support at a high temperature may further include an oxide, a carbonate, a sulfate or a nitrate component such as $Na_2O$, $K_2CO_3$, $BaSO_4$ and $Mg(NO_3)_2$.

The drying temperature of the support is preferably, from 200 to 800° C., more preferably, from 300 to 600° C., most preferably, from 300 to 400° C. If the drying temperature of the support is less than 200° C., humidity is too high and moisture at the surface may react with the co-catalyst, and if the temperature is greater than 800° C., the pores at the surface of the support may be combined to decrease the surface area, and a large amount of the hydroxyl groups at the surface may be removed to remain only siloxane groups to decrease reaction sites with the co-catalyst, undesirably.

In addition, the amount of the hydroxyl group at the surface of the support may preferably be 0.1 to 10 mmol/g, more preferably, 0.5 to 5 mmol/g. The amount of the hydroxyl group at the surface of the support may be controlled by the preparation method and conditions of the support, or drying conditions, for example, temperature, time, vacuum or spray drying.

In addition, an organoaluminum compound may be further injected for removing moisture in a reactor during polymerization reaction, and the polymerization reaction may be performed in the presence thereof. Particular examples of such organoaluminum compound may include trialkylaluminum, dialkylaluminum halide, alkyl aluminum dihalide, aluminum dialkyl hydride or alkyl aluminum sesqui halide, and more particular examples may include $Al(C_2H_5)_3$, $Al(C_2H_5)_2H$, $Al(C_3H_7)_3$, $Al(C_3H_7)_2H$, $Al(i-C_4H_9)_2H$, $Al(C_8H_{17})_3$, $Al(C_{12}H_{25})_3$, $Al(C_2H_5)(C_{12}H_{25})_2$, $Al(i-C_4H_9)(C_{12}H_{25})_2$, $Al(i-C_4H_9)_2H$, $Al(i-C_4H_9)_3$, $(C_2H_5)_2AlCl$, $(i-C_3H_9)_2AlCl$, $(C_2H_5)_3A_{12}Cl_3$, etc. Such organoaluminum compound may be continuously injected into a reactor, or may be injected in a ratio of about 0.1 to 10 mol per 1 kg of a reaction medium injected into the reactor for suitable removal of moisture.

In addition, a polymerization pressure may be about 1 to about 100 Kgf/cm$^2$, preferably, about 1 to about 50 Kgf/cm$^2$, more preferably, about 5 to about 30 Kgf/cm$^2$.

Also, if the transition metal compound is used in a supported type by a support, the transition metal compound may be injected after being dissolved or diluted in an aliphatic hydrocarbon solvent of 5 to 12 carbon atoms, for example, pentane, hexane, heptane, nonane, decane, and isomers thereof, an aromatic hydrocarbon solvent such as toluene and benzene, or a hydrocarbon solvent substituted with a chlorine atom such as dichloromethane and chlorobenzene. The solvent used is preferably used after treating with a small amount of alkyl aluminum to remove a small amount of water or air, which acts as a catalyst poison, and may be used by using a co-catalyst further.

Encapsulant Film and Solar Cell Module

In addition, the composition for an encapsulant film of the present invention may be included in an encapsulant film and used.

The encapsulant film of the present invention may be prepared by molding the composition for an encapsulant film into a film or sheet shape. The molding method is not specifically limited, for example, a sheet or a film may be formed by a common process such as a T die process and extrusion. For example, the manufacture of the encapsulant film may be performed in situ using an apparatus in which the preparation of a modified resin composition using the composition for an encapsulant film and a process for forming a film or a sheet are connected.

The thickness of the encapsulant film may be controlled to about 10 to 2,000 μm, or about 100 to 1,250 μm considering the supporting efficiency and breaking possibility of a device in an optoelectronic device, the reduction of the weight or workability of the device, and may be changed according to the particular use thereof.

In addition, the present invention provides a solar cell module including the encapsulant film. In the present invention, the solar cell module may have a configuration in which the gaps between the solar cells disposed in series or in parallel are filled with the encapsulant film of the present invention, a glass surface is disposed on a side where the sunlight strikes, and a backside is protected by a back sheet, but is not limited thereto. Various types and shapes of the solar cell modules manufactured by including the encapsulant film in this technical field may be applied in the present invention.

The glass surface may use tempered glass for protecting the solar cells from external impact and preventing breaking, and may use low iron tempered glass having low iron content to prevent the reflection of the sunlight and to increase the transmittance of the sunlight, without limitation.

The back sheet is a climate-resistant film protecting the backside of the solar cell module from exterior, for example, a fluorine-based resin sheet, a metal plate or metal film such as aluminum, a cyclic olefin-based resin sheet, a polycarbonate-based resin sheet, a poly(meth)acryl-based resin sheet, a polyamide-based resin sheet, a polyester-based resin sheet, a laminated composite sheet of a climate-resistant film and a barrier film, etc., without limitation.

Besides, the solar cell module of the present invention may be manufactured by any methods well-known in this technical field only if including the encapsulant film, without limitation.

The solar cell module of the present invention is manufactured using an encapsulant film having excellent volume resistance, and the leakage of current outside through the movement of electrons in the solar cell module may be prevented through the encapsulant film. Accordingly, potential induced degradation phenomenon (PID) by which insulation is degraded, leakage current is generated, and the output of the module is rapidly degraded, may be largely restrained.

EXAMPLES

Hereinafter, the present invention will be explained in more detail referring to embodiments. However, the embodiments are provided only for illustration of the present invention, and the scope of the present invention is not limited thereto.

[Preparation of Transition Metal Compound]

Synthetic Example 1

(1) Preparation of Ligand Compound

<Synthesis of N-tert-butyl-1-(1,2-dimethyl-3H-benzo[b]cyclopenta[d]thiophen-3-yl)-1,1-dimethylsilanamine>

To a 100 ml schlenk flask, 4.65 g (15.88 mmol) of the compound of Formula 3 was weighed and added, and 80 ml of THF was injected thereto. At room temperature, $tBuNH_2$ (4 eq, 6.68 ml) was injected thereto and reacted at room temperature for 3 days. After finishing the reaction, THF was removed, and the resultant reaction product was filtered with hexane. After drying solvents, 4.50 g (86%) of a yellow liquid was obtained.

$^1$H-NMR (in $CDCl_3$, 500 MHz): 7.99 (d, 1H), 7.83 (d, 1H), 7.35 (dd, 1H), 7.24 (dd, 1H), 3.49 (s, 1H), 2.37 (s, 3H), 2.17 (s, 3H), 1.27 (s, 9H), 0.19 (s, 3H), −0.17 (s, 3H).

(2) Preparation of Transition Metal Compound

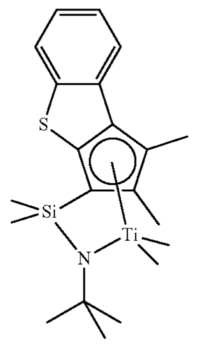

To a 50 ml schlenk flask, the ligand compound (1.06 g, 3.22 mmol/1.0 eq) and 16.0 ml (0.2 M) of MTBE were put and stirred first. n-BuLi (2.64 ml, 6.60 mmol/2.05 eq, 2.5 M in THF) was added thereto at −40° C. and reacted at room temperature overnight. After that, MeMgBr (2.68 ml, 8.05 mmol/2.5 eq, 3.0 M in diethyl ether) was slowly added thereto dropwisely at −40° C., and $TiCl_4$ (2.68 ml, 3.22 mmol/1.0 eq, 1.0 M in toluene) was put in order, followed by reacting at room temperature overnight. After that, the reaction mixture was passed through celite using hexane for filtration. After drying the solvents, 1.07 g (82%) of a brown solid was obtained.

$^1$H-NMR (in $CDCl_3$, 500 MHz): 7.99 (d, 1H), 7.68 (d, 1H), 7.40 (dd, 1H), 7.30 (dd, 1H), 3.22 (s, 1H), 2.67 (s, 3H), 2.05 (s, 3H), 1.54 (s, 9H), 0.58 (s, 3H), 0.57 (s, 3H), 0.40 (s, 3H), −0.45 (s, 3H).

Synthetic Example 2-1

(1) Preparation of Ligand Compound

<Synthesis of N-tert-butyl-1-(1,2-dimetyl-3H-benzo[b]cyclopenta[d]thiophene-3-yl)-1,1-(methyl)(2-methylphenyl) silanamine>

(i) Preparation of chloro-1-(1,2-dimethyl-3H-benzo[b]cyclopenta[d]thiophene-3-yl)-1,1-(methyl)(2-methylphenyl) silane To a 250 ml schlenk flask, 2.0 g (1.0 eq, 9.985 mmol) of 1,2-dimethyl-3H-benzo[b]cyclopenta[d]thiophene and 50 ml of THF were put, and 4.2 ml (1.05 eq, 10.484 mmol, 2.5 M in hexane) of n-BuLi was added thereto dropwisely at −30° C., followed by stirring at room temperature overnight. A stirred Li-complex THF solution was cannulated into a schlenk flask containing 2.46 g (1.2 eq, 11.982 mmol) of dichloro(o-tolylmethyl)silane and 30 ml of THF at −78° C., followed by stirring at room temperature overnight. After stirring, drying in vacuum was carried out and extraction with 100 ml of hexane was carried out.

(ii) Preparation of N-tert-butyl-1-(1,2-dimethyl-3H-benzo[b]cyclopenta[d]thiophene-3-yl)-1,1-(methyl)(2-methylphenyl)silanamine 4.0 g (1.0 eq, 10.0 mmol) of the chloro-1-(1,2-dimethyl-3H-benzo[b]cyclopenta[d]thiophene-3-yl)-1,1-(methyl)(2-methylphenyl)silane thus extracted was stirred in 10 ml of hexane, and at room temperature, 4.2 ml (4.0 eq, 40.0 mmol) of $t\text{-}BuNH_2$ was injected and reacted at room temperature overnight. After the stirring, drying in vacuum was carried out, and extraction with 150 ml of hexane was carried out. After drying the solvents, 4.26 g (99%, dr=1:0.83) of a sticky liquid was obtained.

$^1$H-NMR ($CDCl_3$, 500 MHz): δ 7.95 (t, 2H), 7.70 (d, 1H), 7.52 (d, 1H), 7.47-7.44 (m, 2H), 7.24-7.02 (m, 9H), 6.97 (t, 1H), 3.59 (s, 1H), 3.58 (s, 1H), 2.50 (s, 3H), 2.44 (s, 3H), 2.25 (s, 3H), 2.16 (s, 3H), 2.06 (s, 3H), 1.56 (s, 3H), 1.02 (s, 9H), 0.95 (s, 9H), −0.03 (s, 3H), −0.11 (s, 3H).

(2) Preparation of Transition Metal Compound

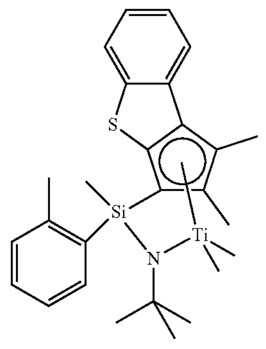

To a 250 ml round bottom flask, the ligand compound of Formula 2-3 (4.26 g, 10.501 mmol) was put in 53 ml (0.2 M) of MTBE and stirred. n-BuLi (8.6 ml, 21.52 mmol, 2.05 eq, 2.5 M in hexane) was added thereto at −40° C. and stirred at room temperature overnight.

Then, MeMgBr (8.8 ml, 26.25 mmol, 2.5 eq, 3.0 M in diethyl ether) was slowly added thereto dropwisely at −40° C., and $TiCl_4$ (10.50 ml, 10.50 mmol) was put in order, followed by stirring at room temperature overnight. After that, the reaction mixture was filtered using hexane. Then, DME (3.3 ml, 31.50 mmol) was added to the filtrate, and the resultant solution was filtered using hexane and then, concentrated to obtain 3.42 g (68%, dr=1:0.68) of a yellow solid.

$^1$H NMR ($CDCl_3$, 500 MHz): δ 7.83 (d, 1H), 7.80 (d, 1H), 7.74 (d, 1H), 7.71 (d, 1H), 7.68 (d, 1H), 7.37 (d, 1H), 7.31-6.90 (m, 9H), 6.84 (t, 1H), 2.54 (s, 3H), 2.47 (s, 3H), 2.31 (s, 3H), 2.20 (s, 3H), 1.65 (s, 9H), 1.63 (s, 9H), 1.34 (s, 3H), 1.00 (s, 3H), 0.98 (s, 3H), 0.81 (s, 3H), 0.79 (s, 3H), 0.68 (s, 3H), 0.14 (s, 3H), −0.03 (s, 3H).

Synthetic Example 2-2

(1) Preparation of Ligand Compound

<Synthesis of N-tert-butyl-1-(1,2-dimetyl-3H-benzo[b]cyclopenta[d]thiophene-3-yl)-1,1-(methyl)(phenyl)silanamine>

(i) Preparation of chloro-1-(1,2-dimethyl-3H-benzo[b]cyclopenta[d]thiophene-3-yl)-1,1-(methyl)(phenyl)silane To a 250 ml schlenk flask, 10 g (1.0 eq, 49.925 mmol) of 1,2-dimethyl-3H-benzo[b]cyclopenta[d]thiophene and 100 ml of THF were put, and 22 ml (1.1 eq, 54.918 mmol, 2.5 M in hexane) of n-BuLi was added thereto dropwisely at −30° C., followed by stirring at room temperature for 3 hours. A stirred Li-complex THF solution was cannulated into a schlenk flask containing 8.1 ml (1.0 eq, 49.925 mmol) of dichloro(methyl)(phenyl)silane and 70 ml of THF at −78° C., followed by stirring at room temperature overnight. After stirring, drying in vacuum was carried out, and extraction with 100 ml of hexane was carried out.

(ii) Preparation of N-tert-butyl-1-(1,2-dimethyl-3H-benzo[b]cyclopenta[d]thiophene-3-yl)-1,1-(methyl)(phenyl)silanamine After injecting 42 ml (8 eq, 399.4 mmol) of $t\text{-}BuNH_2$ to 100 ml of the extracted chloro-1-(1,2-dimethyl-3H-benzo[b]cyclopenta[d]thiophene-3-yl)-1,1-(methyl)(phenyl)silane hexane solution at room temperature, stirring was performed at room temperature overnight. After stirring, drying in vacuum was carried out, and extraction with 150 ml of hexane was carried out. After drying the solvents, 13.36 g (68%, dr=1:1) of a yellow solid was obtained.

$^1$H NMR ($CDCl_3$, 500 MHz): δ 7.93 (t, 2H), 7.79 (d, 1H), 7.71 (d, 1H), 7.60 (d, 2H), 7.48 (d, 2H), 7.40-7.10 (m, 10H, aromatic), 3.62 (s, 1H), 3.60 (s, 1H), 2.28 (s, 6H), 2.09 (s, 3H), 1.76 (s, 3H), 1.12 (s, 18H), 0.23 (s, 3H), 0.13 (s, 3H).

(2) Preparation of Transition Metal Compound

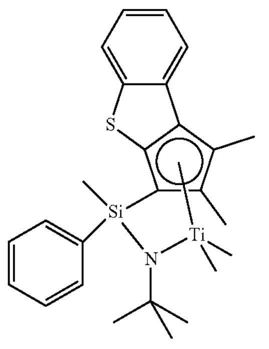

To a 100 ml schlenk flask, 4.93 g (12.575 mmol, 1.0 eq) of the ligand compound of Formula 2-4 and 50 ml (0.2 M) of toluene were put, and 10.3 ml (25.779 mmol, 2.05 eq, 2.5 M in hexane) of n-BuLi was added thereto dropwisely at −30° C., followed by stirring at room temperature overnight. After stirring, 12.6 ml (37.725 mmol, 3.0 eq, 3.0 M in diethyl ether) of MeMgBr was added thereto dropwisely, and 13.2 ml (13.204 mmol, 1.05 eq, 1.0 M in toluene) of $TiCl_4$ was put in order, followed by stirring at room temperature overnight. After stirring, the reaction product was dried in vacuum and extracted with 150 ml of hexane. The solvents were removed to 50 ml, and 4 ml (37.725 mmol, 3.0 eq) of DME was added dropwisely and stirred at room temperature overnight. After drying again in vacuum and extracting with 150 ml of hexane, 2.23 g (38%, dr=1:0.5) of a brown solid was obtained.

$^1$H NMR ($CDCl_3$, 500 MHz): δ 7.98 (d, 1H), 7.94 (d, 1H), 7.71 (t, 6H), 7.50-7.30 (10H), 2.66 (s, 3H), 2.61 (s, 3H), 2.15 (s, 3H), 1.62 (s, 9H), 1.56 (s, 9H), 1.53 (s, 3H), 0.93 (s, 3H), 0.31 (s, 3H), 0.58 (s, 3H), 0.51 (s, 3H), −0.26 (s, 3H), −0.39 (s, 3H).

Synthetic Example 2-3

(1) Preparation of Ligand Compound

<Synthesis of N-tert-butyl-1-(1,2-dimetyl-3H-benzo[b]cyclopenta[d]thiophene-3-yl)-1,1-(2-ethylphenyl)(methyl)silanamine>

(i) Synthesis of chloro-1-(1,2-dimethyl-3H-benzo[b]cyclopenta[d]thiophene-3-yl)-1,1-(2-ethylphenyl)(methyl)silane To a 100 ml schlenk flask, 2 g (1 eq, 9.99 mmol) of 1,2-dimethyl-3H-benzo[b]cyclopenta[d]thiophene and 50 ml of THF were put, and 4 ml (1 eq, 9.99 mmol, 2.5 M in hexane) of n-BuLi was added thereto dropwisely at −30° C., followed by stirring at room temperature overnight. A stirred Li-complex THF solution was cannulated into a schlenk flask containing 2.19 ml (1.0 eq, 9.99 mmol) of dichloro(2-ethylphenyl)(methyl)silane and 50 ml of THF at −78° C., followed by stirring at room temperature overnight. After stirring, drying in vacuum was carried out and extraction with 60 ml of hexane was carried out. After drying again in vacuum and washing with hexane, 3.83 g (99%, dr=1:1) of an ivory solid was obtained.

(ii) Preparation of N-tert-butyl-1-(1,2-dimethyl-3H-benzo[b]cyclopenta[d]thiophene-3-yl)-1,1-(2-ethylphenyl)(methyl)silanamine To a 100 ml round flask, 3.87 g (10.1 mmol) of chloro-1-(1,2-dimethyl-3H-benzo[b]cyclopenta[d]thiophene-3-yl)-1,1-(2-ethylphenyl)(methyl)silane was weighed and added, and 40 ml of hexane was injected thereto. At room temperature, $t-BuNH_2$ (10 eq, 10.5 mL) was injected and reacted at room temperature for 2 days. After the reaction, hexane was removed, and filtering with hexane was carried out. After drying the solvents, 3.58 g (84.4%, dr=1:0.8) of a yellow solid was obtained.

$^1$H-NMR ($CDCl_3$, 500 MHz): δ 7.98 (t, 2H), 7.71 (d, 1H), 7.55 (d, 1H), 7.52 (d, 1H), 7.48 (d, 1H), 7.30 (t, 1H), 7.26-7.22 (m, 3H), 7.19 (dd, 2H), 7.12-7.06 (m, 3H), 7.00 (t, 1H), 3.08-2.84 (m, 4H) 3.05-2.84 (m, 2H), 2.28 (s, 3H), 2.20 (s, 3H), 2.08 (s, 3H), 1.62 (s, 3H), 1.26-1.22 (m, 6H), 1.06 (s, 9H), 0.99 (s, 9H), 0.05 (s, 3H), −0.02 (s, 3H).

(2) Preparation of Transition Metal Compound

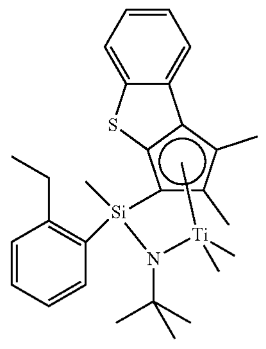

To a 50 ml vial, the ligand compound (1.74 g, 4.14 mmol/1.0 eq) and 20.7 ml (0.2 M) of toluene were put and stirred. n-BuLi (3.48 ml, 8.7 mmol/2.1 eq, 2.5 M in hexane) was added thereto at −40° C. and stirred at room temperature overnight. Then, MeMgBr (4.14 ml, 12.42 mmol/3.0 eq, 3.0 M in diethyl ether) was slowly added thereto dropwisely at −40° C., and $TiCl_4DME$ (1.1 g, 4.14 mmol/1.0 eq) was put in order, followed by stirring at room temperature overnight. After drying the solvents, the reaction mixture was filtered using hexane. Then, DME (1.29 ml, 12.42 mmol/3 eq) was added to the filtrate and stirred at room temperature overnight. After drying the solvents, the resultant product was filtered using hexane to obtain 335 mg (16.3%, dr=1:0.8) of a yellow solid.

$^1$H NMR ($CDCl_3$, 500 MHz): δ 7.90 (d, 1H), 7.85 (d, 1H), 7.74 (d, 1H), 7.71 (d, 1H), 7.40 (d, 1H), 7.37 (d, 1H), 7.27 (d, 1H), 7.23 (t, 2H), 7.17 (t, 2H), 7.13 (t, 2H), 7.06 (t, 1H), 7.01 (t, 1H), 6.86 (t, 1H), 2.97-2.91 (m, 2H), 2.90-2.82 (m, 2H), 2.33 (s, 3H), 2.22 (s, 3H), 1.96 (s, 3H), 1.68 (s, 9H), 1.66 (s, 9H), 1.38 (s, 3H), 1.32 (t, 3H), 1.24 (t, 3H), 1.07 (s, 3H), 0.88 (s, 3H), 0.85 (s, 3H), 0.72 (s, 3H), 0.19 (s, 3H), 0.01 (s, 3H).

Comparative Synthetic Example 1

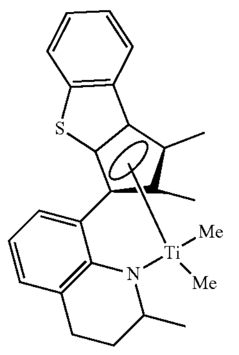

The compound above was synthesized according to a method described in Korean Laid-open Patent Publication No. 2015-0034653 and then, used.

[Preparation of Ethylene/Alpha-Olefin Copolymer]

Preparation Example 1

While injecting a hexane solvent in 5.0 kg/h and 1-butene in 0.95 kg/h, a 1.5 L continuous process reactor was pre-heated at 130° C. A triisobutylaluminum compound (0.050 mmol/min), a mixture (0.120 μmol/min) of the transition metal compounds obtained in Synthetic Example 1 and Synthetic Example 2-1 in a molar ratio of 3:7, and a dimethylanilinium tetrakis(pentafluorophenyl)borate co-catalyst (0.144 μmol/min) were put in the reactor at the same time. Then, into the reactor, ethylene (0.87 kg/h) and a hydrogen gas (23 cc/min) were injected and copolymerization reaction was continuously carried out while maintaining a pressure of 89 bar and 130° C. for 60 minutes or more to prepare a copolymer. After drying for 12 hours or more in a vacuum oven, physical properties were measured.

Preparation Examples 2 to 4, and Comparative Preparation Examples 1 to 6

Ethylene/alpha-olefin copolymers were prepared by the same method as in Preparation Example 1 except for changing polymerization conditions as shown in Table 1 below.

TABLE 1

| | Catalyst | Cat. | Co-cat. | Tibal | C2 | C6 | Alpha-olefin | | Hydrogen | Temp |
|---|---|---|---|---|---|---|---|---|---|---|
| | type | μmol/min | | mmol/min | kg/h | | Type | kg/h | cc/min | ° C. |
| Preparation Example 1 | Synthetic Example 1 + Synthetic Example 2-1 | 0.120 | 0.144 | 0.050 | 0.87 | 5.0 | 1-C4 | 0.95 | 23 | 130 |
| Preparation Example 2 | Synthetic Example 1 + Synthetic Example 2-1 | 0.120 | 0.144 | 0.050 | 0.87 | 5.0 | 1-C4 | 0.90 | 27 | 130 |
| Preparation Example 3 | Synthetic Example 1 + Synthetic Example 2-1 | 0.120 | 0.144 | 0.050 | 0.87 | 5.0 | 1-C4 | 0.90 | 20 | 130 |
| Preparation Example 4 | Synthetic Example 1 + Synthetic Example 2-1 | 0.120 | 0.144 | 0.050 | 0.87 | 5.0 | 1-C4 | 0.85 | 24 | 130 |
| Comparative Preparation Example 1 | Comparative Synthetic Example 1 | 0.700 | 2.100 | 0.030 | 0.87 | 5.1 | 1-C8 | 1.04 | — | 160 |
| Comparative Preparation Example 2 | Comparative Synthetic Example 1 | 0.700 | 2.100 | 0.030 | 0.87 | 5.1 | 1-C8 | 1.04 | — | 160 |
| Comparative Preparation Example 3 | Synthetic Example 2-1 | 0.120 | 0.144 | 0.040 | 0.87 | 5.0 | 1-C4 | 0.70 | 23 | 130 |
| Comparative Preparation Example 4 | Synthetic Example 2-2 | 0.125 | 0.147 | 0.045 | 0.87 | 5.0 | 1-C4 | 0.76 | 26 | 130 |
| Comparative Preparation Example 5 | Synthetic Example 2-3 | 0.125 | 0.147 | 0.045 | 0.87 | 5.0 | 1-C4 | 0.76 | 26 | 130 |
| Comparative Preparation Example 6 | Synthetic Example 1 | 0.120 | 0.144 | 0.045 | 0.87 | 5.0 | 1-C8 | 0.45 | 6 | 130 |

[Analysis of Ethylene/Alpha-Olefin Copolymer]

Experimental Example 1

With respect to the ethylene/alpha-olefin copolymers prepared in the Preparation Examples and Comparative Preparation Examples, physical properties were measured by the methods below and are shown in Table 2.

(1) Density

Measurement was conducted according to ASTM D-792.

(2) Melt Index (MI2.16)

Measurement was conducted according to ASTM D-1238 (condition E, 190° C., 2.16 kg load).

(3) Melting Temperature (Tm)

By using a differential scanning calorimeter (DSC 6000) manufactured by PerkinElmer Co., under a nitrogen atmosphere, the temperature of the copolymer was elevated to 150° C., maintained for 5 minutes, decreased to −100° C., and elevated again, and a DSC curve was observed. In this case, the temperature elevating rate and decreasing rate were 10° C./min, respectively. In the measured DSC curve, the melting temperature was the maximum point of an endothermic peak during the second temperature elevation.

(4) Elution Temperature (Te)

By using a cross-fractionation chromatography (CFC) equipment of Polymer Char Co. and o-dichlorobenzene as a solvent, measurement was conducted in a range of −20 to 130° C. Particularly, a solution in which a copolymer sample was dissolved in an o-dichlorobenzene solvent at 130° C. into a concentration of 5.0 mg/ml, was cooled to −20° C. in a rate of 0.50° C./min, and while heating and elevating the temperature from −20° C. to 130° C. in an elevating rate of 1° C./min, the o-dichlorobenzene solvent was flown in a flow rate of 0.5 ml/min on a column, and the amount (wt %) of the polymer eluted was measured for each temperature. The elution temperature was defined as a temperature corresponding to the maximum point in the peaks present after −20° C. when drawing a graph of temperature vs. elution fraction.

(5) Weight Average Molecular Weight (Mw) and Molecular Weight Distribution (MWD)

A weight average molecular weight (Mw) and a number average molecular weight (Mn) were measured under analysis conditions of gel permeation chromatography (GPC) below with respect to the copolymers produced, and molecular weight distribution was calculated from the ratio of Mw/Mn.

Column: Agilent Olexis

Solvent: Trichlorobenzene

Flow rate: 1.0 ml/min

Specimen concentration: 1.0 mg/ml

Injection amount: 200 μl column temperature: 160° C.

Detector: Agilent High Temperature RI detector

Standard: Polystyrene (calibrated by cubic function)

Data processing: Cirrus

TABLE 2

| | Density ($g/cm^3$) | MI (dg/min) | Tm (° C.) | Te (° C.) | Tm − Te | Mw (g/mol) | MWD |
|---|---|---|---|---|---|---|---|
| Preparation Example 1 | 0.875 | 14.3 | 62.8 | 26.5 | 36.3 | 57,000 | 2.02 |
| Preparation Example 2 | 0.876 | 20.0 | 64.2 | 27.2 | 37.0 | 51,000 | 2.05 |
| Preparation Example 3 | 0.876 | 5.3 | 63.3 | 28.2 | 35.1 | 74,000 | 2.11 |

TABLE 2-continued

| | Density ($g/cm^3$) | MI (dg/min) | Tm (° C.) | Te (° C.) | Tm − Te | Mw (g/mol) | MWD |
|---|---|---|---|---|---|---|---|
| Preparation Example 4 | 0.877 | 14.1 | 66.2 | 28.6 | 37.6 | 58,000 | 2.05 |
| Comparative Preparation Example 1 | 0.873 | 5.2 | 90.2 | 23.8 | 66.4 | 75,000 | 2.63 |
| Comparative Preparation Example 2 | 0.872 | 5.0 | 86.1 | 20.6 | 65.5 | 76,000 | 2.51 |
| Comparative Preparation Example 3 | 0.878 | 5.0 | 61.2 | 27.9 | 33.3 | 76,000 | 2.05 |
| Comparative Preparation Example 4 | 0.877 | 5.8 | 60.7 | 27.0 | 33.7 | 78,000 | 2.06 |
| Comparative Preparation Example 5 | 0.878 | 5.6 | 62.0 | 28.5 | 33.5 | 77,000 | 2.04 |
| Comparative Preparation Example 6 | 0.900 | 6.4 | 97.8 | 59.8 | 38.0 | 67,000 | 2.18 |

As described in Table 2, it was confirmed that the ethylene/alpha-olefin copolymers of the Preparation Examples according to the present invention satisfied all of the density, the Tm, and the Tm−Te value, defined in the present invention. On the contrary, Comparative Preparation Examples 1 and 2 showed large values of a Tm−Te value of 65° C. or more, Comparative Preparation Examples 3 to 5 showed small values of 35° C. or less and did not satisfy Equation 1 defined in the present invention, and Comparative Preparation Example 6 satisfied the range of Equation 1 but showed the density and the Tm value not corresponding to the definition of the present invention.

[Manufacture of Encapsulant Film]

Example 1

To 500 g of the sample of Preparation Example 1, 1 phr (parts per hundred rubber) of t-butyl 1-(2-ethylhexyl) monoperoxycarbonate (TBEC), 0.5 phr of triallylisocyanurate (TAIC), and 0.2 phr of methacryloxypropyltrimethoxysilane (MEMO) were injected to prepare a composition for an encapsulant film. Then, soaking was performed at 40° C. for 1 hour, and aging was performed for 15 hours.

After that, an encapsulant film having an average thickness of 550 μm was manufactured at a low temperature to a degree not achieving high-temperature crosslinking (conditions of 100° C. or less of extruder barrel temperature) using a micro extruder.

Examples 2 to 4, and Comparative Examples 1 to 6

Encapsulant films were manufactured by the same method as in Example 1 except for using the copolymers of Preparation Examples 2 to 4, and Comparative Preparation Examples 1 to 6 as samples, respectively.

[Analysis of Encapsulant Film]

Experimental Example 2

Between two release films (thickness: about 100 μm), the encapsulant film (15 cm×15 cm) with a thickness of 550 μm thus manufactured was put and crosslinked by lamination in a vacuum laminator at a process temperature of 150° C. for a process time of 19 minutes and 30 seconds (vacuum for 5 minutes/pressurizing for 1 minute/keeping pressure for 13 minutes and 30 seconds).

Then, volume resistance and light transmittance were measured by the methods below and recorded in Table 3 below.

(1) Volume Resistance

Measurement was conducted by applying a voltage of 1000 V for 60 seconds using Agilent 4339B High-resistance meter (product of Agilent Technologies K.K.) under temperature conditions of 23±1° C. and humidity conditions of 50±3%.

(2) Light Transmittance

Light transmittance at 550 nm was measured using Shimadzu UV-3600 spectrophotometer.

Measurement mode: Transmittance

Wavelength interval: 1 nm

Measurement rate: Medium

TABLE 3

| | Volume resistance (Ω · cm) | Light transmittance (%) |
|---|---|---|
| Example 1 | $6.2 \times 10^{15}$ | 91.4 |
| Example 2 | $5.5 \times 10^{15}$ | 91.3 |
| Example 3 | $9.5 \times 10^{15}$ | 91.6 |
| Example 4 | $7.7 \times 10^{15}$ | 91.4 |
| Comparative Example 1 | $6.2 \times 10^{14}$ | 89.0 |
| Comparative Example 2 | $6.9 \times 10^{14}$ | 89.3 |
| Comparative Example 3 | $8.0 \times 10^{14}$ | 91.3 |
| Comparative Example 4 | $8.2 \times 10^{14}$ | 91.5 |
| Comparative Example 5 | $7.5 \times 10^{14}$ | 91.7 |
| Comparative Example 6 | $1.0 \times 10^{15}$ | 88.5 |

As shown in the table, it was confirmed that the encapsulant films of the Examples according to the present invention achieved both high volume resistance and high light transmittance in contrast to the Comparative Examples. Particularly, it was confirmed that Comparative Examples 1 and 2 included copolymers with Tm−Te values of 65° C. or more, and due to a low-crystalline region, volume resistance was degraded, and due to a high-crystalline region, light transmittance was low, and Comparative Examples 3 to 5 included copolymers with Tm−Te values of 35° C. or less, and volume resistance was particularly lowered. In addition, Comparative Example 6 satisfied the range of Equation 1, but since the density and the Te value were too large, the light transmittance was particularly low.

As described above, if an encapsulant film is manufactured using an ethylene/alpha-olefin copolymer satisfying the density, Tm, and Tm−Te value, defined in the present invention, excellent volume resistance and light transmittance could be accomplished without using a separate additive.

The invention claimed is:

1. A composition for an encapsulant film comprising an ethylene/alpha-olefin copolymer satisfying the following conditions (a) to (c), and having an elution temperature (Te) having a maximum peak in a curve obtained by cross-fractionation chromatography (CFC) of 25° C. to 35° C.:

(a) a density is 0.85 to 0.89 g/cc;

(b) a melting temperature (Tm) having a maximum peak in a curve obtained by differential scanning calorimetry (DSC) is 60 to 90° C.; and (c) the melting temperature (Tm) and the elution temperature (Te) satisfy Equation 1:

$$35°\ C. < Tm - Te < 65°\ C. \quad \text{[Equation 1]}$$

2. The composition for an encapsulant film according to claim 1, wherein a molecular weight distribution of the ethylene/alpha-olefin copolymer is 1.5 to 2.5.

3. The composition for an encapsulant film according to claim 1, wherein a melt index (MI), under 190° C. and 2.16 kg load conditions, of the ethylene/alpha-olefin copolymer is 1 to 100 dg/min.

4. The composition for an encapsulant film according to claim 1, wherein a weight average molecular weight of the ethylene/alpha-olefin copolymer is 40,000 to 150,000 g/mol.

5. The composition for an encapsulant film according to claim 1, wherein the alpha-olefin comprises one or more of propylene, 1-butene, 1-pentene, 4-methyl-1-pentene, 1-hexene, 1-heptene, 1-octene, 1-decene, 1-undecene, 1-dodecene, 1-tetradecene, 1-hexadecene or 1-eicosene.

6. The composition for an encapsulant film according to claim 1, wherein the alpha-olefin is comprised in an amount of greater than 0 mol % and 99 mol % or less with respect to the ethylene/alpha-olefin copolymer.

7. The composition for an encapsulant film according to claim 1, further comprising one or more of a crosslinking agent, a crosslinking auxiliary agent, a silane coupling agent, an unsaturated silane compound, an amino silane compound, a light stabilizer, a UV absorbent or a thermal stabilizer.

8. An encapsulant film comprising the composition for an encapsulant film according to claim 1.

9. A solar cell module comprising the encapsulant film of claim 8.

10. A method for preparing the composition for an encapsulant film according to claim 1, the method comprising polymerizing ethylene and an alpha-olefin-based monomer in the presence of a catalyst composition including a transition metal compound represented by Formula 1 and a transition metal compound represented by Formula 2 to prepare the ethylene/alpha-olefin copolymer,

[Formula 1]

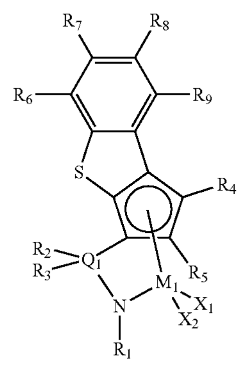

in Formula 1, $R_1$ is hydrogen; alkyl of 1 to 20 carbon atoms; cycloalkyl of 3 to 20 carbon atoms; alkenyl of 2 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, $R_2$ and $R_3$ are each independently hydrogen; halogen; alkyl of 1 to 20 carbon atoms; cycloalkyl of 3 to 20 carbon atoms; alkenyl of 2 to 20 carbon atoms; arylalkyl of 7 to 20 carbon atoms; alkylamido of 1 to 20 carbon atoms; or arylamido of 6 to 20 carbon atoms, $R_4$ and $R_5$ are each independently hydrogen; alkyl of 1 to 20 carbon atoms; cycloalkyl of 3 to 20 carbon atoms; aryl of 6 to 20 carbon atoms; or alkenyl of 2 to 20 carbon atoms, $R_6$ to $R_9$ are each independently hydrogen; alkyl of 1 to 20 carbon atoms; cycloalkyl of 3 to 20 carbon atoms; aryl of 6 to 20 carbon atoms; or alkenyl of 2 to 20 carbon atoms, or two or more adjacent groups among $R_6$ to $R_9$ are optionally connected with each other to form a ring, $Q_1$ is Si, C, N, P or S, $M_1$ is Ti, Hf or Zr, and $X_1$ and $X_2$ are each independently hydrogen; halogen; alkyl of 1 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; alkylamino of 1 to 20 carbon atoms; or arylamino of 6 to 20 carbon atoms,

[Formula 2]

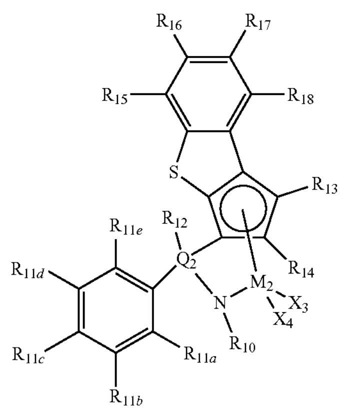

in Formula 2, $R_{10}$ is hydrogen; alkyl of 1 to 20 carbon atoms; cycloalkyl of 3 to 20 carbon atoms; alkenyl of 2 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, $R_{11a}$ to $R_{11e}$ are each independently hydrogen; halogen; alkyl of 1 to 20 carbon atoms; cycloalkyl of 3 to 20 carbon atoms; alkenyl of 2 to 20 carbon atoms; alkoxy of 1 to 20 carbon atoms; or aryl of 6 to 20 carbon atoms, $R_{12}$ is hydrogen; halogen; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; alkylamido of 1 to 20 carbon atoms; or arylamido of 6 to 20 carbon atoms, $R_{13}$ and $R_{14}$ are each independently hydrogen; alkyl of 1 to 20 carbon atoms; cycloalkyl of 3 to 20 carbon atoms; aryl of 6 to 20 carbon atoms; or alkenyl of 2 to 20 carbon atoms, $R_{15}$ to $R_{18}$ are each independently hydrogen; alkyl of 1 to 20 carbon atoms; cycloalkyl of 3 to 20 carbon atoms; aryl of 6 to 20 carbon atoms; or alkenyl of 2 to 20 carbon atoms, or two or more adjacent groups among $R_{15}$ to $R_{18}$ are optionally connected with each other to form a ring, $Q_2$ is Si, C, N, P or S, $M_2$ is Ti, Hf or Zr, and $X_3$ and $X_4$ are each independently hydrogen; halogen; alkyl of 1 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; alkylamino of 1 to 20 carbon atoms; or arylamino of 6 to 20 carbon atoms.

11. The method according to claim 10, wherein a molar ratio of the transition metal compound represented by Formula 1 and the transition metal compound represented by Formula 2 is 1:0.5 to 1:8.

12. The method according to claim 10, wherein hydrogen is injected at 5 to 100 cc/min.

* * * * *